United States Patent Office 3,455,905
Patented July 15, 1969

3,455,905
POLYHYDROXY STEROIDS AND PROCESSES FOR THEIR PREPARATION
John A. Edwards, John H. Fried, and John B. Siddall, Palo Alto, Calif., assignors, by mesne assignments, to Zoecon Corporation, Palo Alto, Calif., a corporation of Delaware
No Drawing. Continuation-in-part of applications Ser. No. 506,410, Nov. 4, 1965, and Ser. No. 523,019, Jan. 26, 1966. This application May 26, 1966, Ser. No. 553,041
Int. Cl. C07c 167/20, 173/00, 169/62
U.S. Cl. 260—239.55
18 Claims

ABSTRACT OF THE DISCLOSURE

Synthesis of polyhydroxy steroids including the insect hormone, ecdysone, and intermediates therefor.

This is a continuation-in-part of copending applications Ser. Nos. 506,410, now Patent No. 3,378,549, and 523,019, now Patent No. 3,354,154, filed Nov. 4, 1965, and Jan. 26, 1966, respectively.

The present invention is directed at novel polyhydroxy steroids and to processes for their preparation. Specifically, this invention is directed at processes for preparing compounds of the formula:

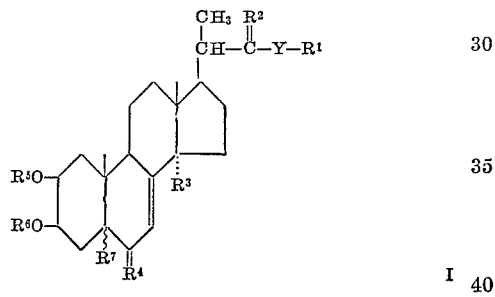

I wherein
$R^1$ is hydrogen, hydroxy, tetrahydropyran-2-yloxy, or a hydrocarbon carboxylic acyloxy group of less than 12 carbon atoms;
$R^2$ is an oxygen atom or (hydrogen, hydroxy);
$R^3$ is hydrogen or hydroxy;
$R^4$ is an oxygen atom or (hydrogen, hydroxy);
Each of $R^5$ and $R^6$ is hydrogen or a hydrocarbon carboxylic acyl group of less than 12 carbon atoms, or taken together, the group

in which each of A and B is hydrogen or lower alkyl;
$R^7$ is α-hydrogen, β-hydrogen or α-hydroxy; and
Y is an alkylene group of from 3 to 8 carbon atoms, there being at least 3 carbon atoms between the valence bonds of said alkylene group. Moreover, the present invention is directed at the novel compounds of the above formula wherein $R^1$, $R^2$, $R^3$, $R^4$, $R^5$, $R^6$, $R^7$ and Y are as defined, but characterized by the proviso that when $R^1$, $R^2$ and $R^3$ are all hydroxy, at least one of $R^4$ and $R^7$ is also hydroxy.

The presence of "asymmetric" carbon atoms in several positions of the above formula permit the existence of isomeric forms. As noted in greater detail hereafter, the methods of the present invention generate both forms, unless otherwise noted, and these forms may be readily separated from one another through conventional methods, e.g., chromatography, fractional crystallization, or the like.

Unless otherwise noted, all such isomeric forms are embraced by the present invention. Use of a wavy line, "⌇," indicates both alpha and beta configurations, either singularly or collectively. With specific reference to the configuration at C–20 and C–22, the designations α and β are used in accordance with the Fischer convention.

The term "alkyl" and derivations thereof such as alkylene, alkanoic, etc., denotes an aliphatic hydrocarbon group. When qualified by the term "lower," such a group will contain no more than 6 carbon atoms. The alkylene group designated by Y will contain at least 3 carbon atoms, but in all cases will comprise a straight chain of 3 carbon atoms between $R^1$ and the remainder of the nucleus. This chain of 3 or more carbon atoms may, however, be substituted by one or more alkyl groups of 5 or less carbon atoms.

The foregoing compounds demonstrate the ability to affect the growth of insects and are accordingly useful in the control and management of insect population, in addition to finding broad use in biological research. They may be employed for insect control in the same manner as the related insect hormore, ecdysone, whose structure and use are known. Furthermore, the process of the present invention is particularly valuable in synthesizing this compound, and many of the compounds of the present invention also serve as valuable intermediates in that synthesis.

Preparations of the compounds of the present invention, and with the appropriate selection of reagents, ecdysone, are described in the copending applications recited above. Among the processes therein set forth in detail is the multistep conversion of a 3β-acyloxy-22,23-bisnorchol-5-enoic acid alkyl ester to 2β,3β-alkylidenedioxy-6-hydroxy-22,23-bisnorchol-7-enoic acid alkyl esters of the formula:

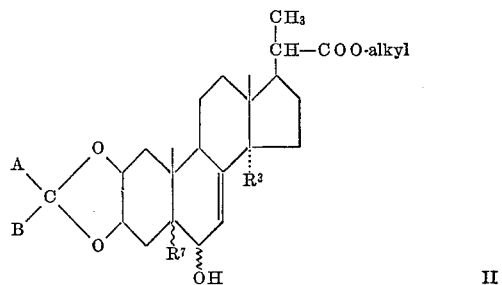

II wherein A, B, $R^3$ and $R^7$ are as previously defined. Also set forth in said copending applications is the subsequent conversion of compounds of Formula II, particularly those compounds wherein $R^7$ is β-hydrogen and $R^3$ is hydroxy, to cholest-7-ene derivatives of Formula I. Utilizing the carbonyl group of the alkyl ester (Formula II) as the reaction site, this latter conversion employs in one approach various Grignard reagents in introducing the remainder of the side chain. The resultant compounds having a 22-keto group are then reduced to the corresponding 22α- and 22β-hydroxy derivatives with subsequent selective oxidation of the 6-hydroxy group, if desired, to yield the 6-keto compound.

Through utilization of the same carbonyl group as the site of the reaction, alkylation of an intermediate ester of Formula II is also accomplished through the use of a two-step synthesis to yield a 2β,3β-alkylidenedioxy-6-hydroxy-cholest-7-en-22-one of Formula I, wherein $R^2$ is an oxygen atom and $R^1$ is hydrogen (or a hydroxy group protected in the form of a tetrahydropyran-2-yl ether).

In accordance with the synthetic route of this latter method, an intermediate 22,23-bisnorchol-7-enoic acid alkyl ester, such as one of Formula II, is treated under basic conditions with a sulfoxide reagent capable of forming a carbanion at one of the positions alpha to the sulfoxide function. The resultant α-sulfinyl carbonyl derivative is in turn treated with aluminum amalgam, effecting reductive elimination of the sulfinyl group. The 22-keto product may then be processed as hereafter described to yield the desired product.

It has now been discovered that the foregoing conversion involving alkyl esters of cholenoic acid derivatives and sulfur derivatives of alkanes has broader applications in the synthesis of polyhydroxy steroids such as those represented by Formula I. In particular, it has been found that the alkyl esters of 22,23-bisnorcholanoic acid derivatives may be alkylated through treatment with an alkali metal salt, such as a sodium or lithium salt, preferably lithium, of an alkyl sulfur compound of the formula:

$$R^8\text{---}CH_2\text{---}W \qquad (III)$$

in which $R^8$ is hydrogen, lower alkyl, or hydroxyalkyl (including etherified derivatives thereof such as tetrahydropyranyloxyalkyl, alkoxyalkyl, alkenyloxyalkyl, benzyloxyalkyl, and the like), and W is —S—$R^9$, —SO—$R^9$, —SO$_2R^9$, or —SO—N($R^9$)$_2$, wherein $R^9$ is lower alkyl or phenyl. Suitable reagents thus include sulfides, sulfoxides, sulfones, and sulfonamides. When $R^9$ is lower alkyl, $R^8$ is preferably hydrogen or lower alkyl and the group $R^8$—$CH_2$— is ideally the same as $R^9$. When $R^9$ is phenyl, $R^8$ may be as defined above. This alkylation may be represented as follows, only the pertinent portion of the steroid nucleus being represented:

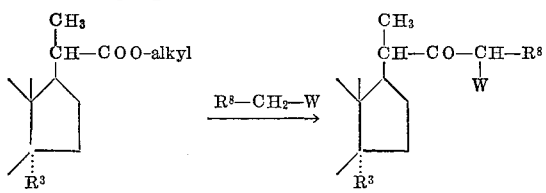

For purposes of brevity, the following description utilizes the sulfinyl group as typical, it being understood that the other sulfur derivatives described above may be employed in an analogous fashion.

One application of the foregoing procedure is that described in copending application Serial No. 523,019 and involves introduction of the side chain group represented by $R^8$, as for example a 3-methyl-3-(tetrahydropyran-2-yloxy)propyl fragment, as well as other alkyl or substituted alkyl fragments. In this embodiment the substituent W should be free of acidic hydrogens on the carbon atom alpha to the sulfinyl group. Accordingly, one preferably employs a compound of Formula III wherein W is a phenylsulfinyl group. The reaction product is then treated with aluminum amalgam, active Raney nickel, zinc and acetic acid, chromous chloride or the like, to effect reductive desulfinylation and provide compounds having the side chain —$CH_2R^8$ attached to the carbonyl group. The group $R^8$ may be a straight or branched alkyl group of 2 to 7 carbon atoms (thus constituting, together with the methylene group through which it is attached, the side chain in Formula I wherein Y is alkylene of 3 to 8 carbon atoms and $R^1$ is hydrogen). Typical of such groups embraced by $R^8$ are 2,2-dimethylpropyl, 2-methylpropyl, propyl, butyl, and the like. $R^8$ may also bear a hydroxyalkyl group. Generally in such instances this hydroxy group is previously protected, as for example through formation of a tetrahydropyranyl ether, allyl ether or the like.

A second embodiment of the present invention involves the use of these sulfinyl derivatives as reactive intermediates themselves. Thus, upon treatment under basic conditions with an α-halocarbonyl derivative, particularly an α-bromo or α-chloroalkyl ketone or an alkyl α-bromo- or α-chloroalkanoate, alkylation of the methylene group bridging the carbonyl group (derived from the cholenoic acid) and the sulfinyl group is effected. This alkylation is conducted under anhydrous conditions such as in dimethylsulfoxide, methanol, tetrahydrofuran, or the like in the presence of a base such as sodium hydride, sodium methoxide, potassium t-butoxide or the like, and may be represented as follows:

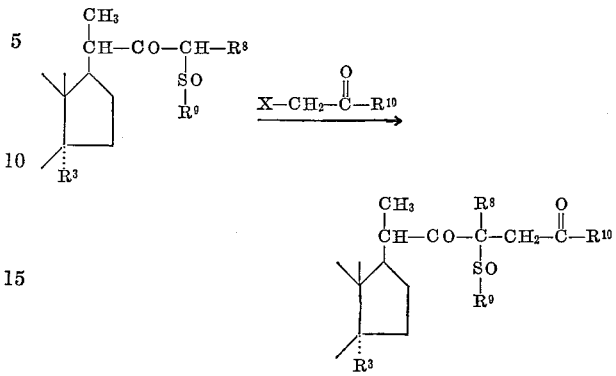

In the foregoing, $R^{10}$ is a lower alkyl group or a lower alkoxy group.

The product of this alkylation may also be treated as hereinabove described to cause reductive elimination of the sulfinyl group. The resulting dicarbonyl side chain may then be reduced as with an alkali metal hydride to a mono or dihydroxy chain or may be treated with an organometallic reagent such as methylmagnesium bromide, methyl lithium or the like, to effect further variation through alkylation. In this route, in which the sulfinyl group is removed, the group $R^9$ is again preferably free of acidic hydrogen atoms on the carbon atoms in the position alpha to the sulfinyl group, e.g., $R^9$ is phenyl.

Alternatively, the product of this alkylation may be internally cyclized by further contact with a basic reaction medium. This is conveniently accomplished by employing additional equivalents of base when treating the ester with the α-halocarbonyl derivative. For this embodiment, the group $R^9$ must contain acidic hydrogen atoms on the carbon atom alpha to the sulfinyl group, e.g., $R^9$ is lower alkyl. These transformations may be represented as follows, in which $R^{9'}$ is hydrogen or lower alkyl:

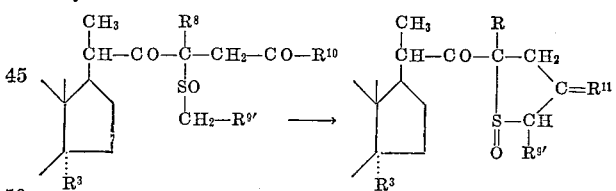

In the above, depending upon whether $R^{10}$ is lower alkyl or lower alkoxy, $R^{11}$ is

or $$\overset{O}{\underset{\|}{}}$$

respectively.

The cyclic sulfoxide thus obtained may be opened with elimination of the sulfinyl group. In the case in which $R^{11}$ is $$\overset{O}{\underset{\|}{}}$$

this is accomplished in the manner previously described, as with aluminum amalgam or similar agents. This transformation may be represented as follows:

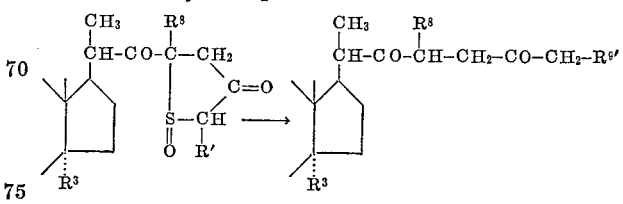

The foregoing diketo side chain may then be reduced or alkylated as previously described.

In the case in which $R^{11}$ is

the cyclic sulfoxide is also opened through treatment with aluminum amalgam. In this case, however, an intermediate mercaptan is obtained which is further reduced through the action of Raney nickel. These transformations may be represented as follows:

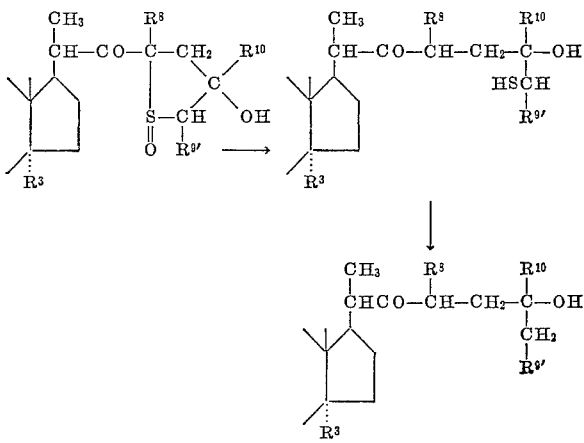

The foregoing transformations may be performed with compounds wherein the steroid nucleus previously has been elaborated. This elaboration, starting with known materials, may be accomplished in the following manner, described in said copending applications. A 3β-acyloxy-22,23-bisnorchol-5-enoic acid alkyl ester is first treated with hot formic acid for 30 or more minutes and, after cooling, the product is subjected to the action of hydrogen peroxide. Subsequent alkaline hydrolysis yields, the 3β,5α,-6β-trihydroxy-22,23-bisnorcholanoic acid alkyl ester which is oxidized, as with N-bromosuccinimide, to yield the corresponding 6-keto compound. Dehydration, leading to the Δ² compound, may then be achieved through selective formation of a 3-ester, as through treatment with p-toluenesulfonic acid, benzenesulfonic acid, p-bromobenzenesulfonyl chloride, or benzoyl chloride in pyridine, and treatment of this ester with base, e.g., lithium carbonate, tertiary amines, or the like. This 5α-hydroxy-6-keto-22,23-bisnorchol-2-enoic acid alkyl ester is then converted to the 2β,3β-diol with N-bromosuccinimide in glacial acetic acid, followed by treatment with a silver salt in an alcohol or tetrahydrofuran, or with anhydrous acetic acid, iodine and dry silver acetate, followed by treatment with silver nitrate and aqueous alcohol. Esterification in, for example, an aromatic amine such as an alkyl pyridine or pyridine alone or with dioxane, with an esterifying agent such as acetic or caproic anhydride, affords the corresponding 2β,-3β-diacylate. Introduction of the Δ⁷ double bond is next accomplished through α-halogenation with bromine or chlorine, preferably the former, in the presence of an acid catalyst, e.g., a mineral or Lewis acid. Dehydrohalogenation of the 7-halo intermediate with calcium carbonate, lithium carbonate or the like furnishes the 2β,3β-diacyloxy-5α-hydroxy-6-keto-22,23-bisnorchol-7-enoic acid alkyl ester which may contain small amounts of the Δ⁸⁽¹⁴⁾ isomer, readily separable at this stage or later through chromatographic techniques. A 2β,3β,5α-triacylate is next obtained by conventional esterification by, for example, treatment with an anhydride such as acetic or caproic anhydride under acid catalysis such as with benzenesulfonic a Lewis acid or anhydrous mineral acids. A 14α-hydroxy function is then introduced, if desired, directly by treatment of the triacylate with tellurium or selenium dioxide, preferably selenium dioxide, in an ether solvent, such as dioxane, by refluxing for several hours, thus furnishing the 2β,3β,5α-triacyloxy-6-keto-14α-hydroxy-22,23-bisnorchol-7-enoic acid alkyl ester. The 5α-acyloxy group is next selectively removed from this 14α-hydroxy-6-keto triacylate, if desired, by treatment for a short period with a transition metal salt or complex thereof such as chromous halide or acetate, preferably chromous chloride, in an aqueous or a ketone solvent, preferably acetone, thus affording the 2β,3β-diacyloxy-14α-hydroxy-6-keto-22,23-bisnor-5α-chol-7-enoic acid alkyl ester in high yield. The order of these two steps may alternatively be reversed. Alkaline hydrolysis of of the 2β,3β-diacyloxy group, followed in the case of 5α-desoxy compounds by inversion of the configuration in the 5α-position as with potassium carbonate, yields the corresponding 2β,3β-dihydroxy-5α-steroid and the 2β,3β-dihydroxy-5β-steroid, respectively. The hydrolysis and inversion may be performed in one operation. The free 2β,3β-dihydroxy-5β-compound is next treated with a ketone such as acetone in the presence of a trace of acid such as p-toluenesulfonic acid to yield the 2β,3β-alkylidenedioxy-6-keto-14α-hydroxy-22,23 - bisnorchol-7-enoic acid alkyl ester. The 6-keto group is then reduced as with sodium borohydride, lithium tri(t-butoxide)aluminum hydride, or the like, to give a mixture of 6α- and 6β-hydroxy compounds which may be separated through chromatography or subjected to the next step as a mixture.

The thus-elaborated 22,23-bisnorcholenoic acid alkyl ester is then subjected to the processes of the present invention. Thus, for example, the 2β,3β-alkylidenedioxy-6,14α-dihydroxy-22,23-bisnor-5β-chol - 7 - enoic acid alkyl ester is treated in the presence of sodium hydride with the lithium salt of a sulfoxide of Formula II, wherein $R^9$ is phenyl and $R^8$ is a lower alkyl group or an etherified hydroxyalkyl group. Typical of these is the lithium salt of 1-phenylsulfinyl-3-methyl-3-(tetrahydropyran-2-yloxy) butane. After isolation according to conventional techniques, the resulting 23-phenylsulfinylcholest-7-ene, with optional substitution as previously indicated, is treated with aluminum amalgam in an aqueous inert organic solvent such as aqueous tetrahydrofuran to yield the desired steroid, as for example a 2β,3β-alkylidenedioxy-6, 14α - dihydroxy - 25 - (tetrahydropyran - 2 - yloxy) - 5β-cholest-7-en-22-one.

The requisite reactant intermediate may be obtained, for example, via the reaction of the sodium salt of the appropriate halide and sodium phenylmercaptide to yield the corresponding sulfide which is then oxidized to the sulfoxide via conventional procedures, e.g., through the use of sodium iodate. After drying, the sulfoxide is treated with phenyl lithium in the presence of sodium hydride to yield the lithium salt.

Reduction of the 22-keto steroid may be accomplished by treatment with an alkali aluminum hydride or an alkalki aluminum tri-t-butoxy hydride, preferably lithium aluminum hydride in an anhydrous organic ether, such as tetrahydrofuran, resulting in the 22-hydroxy steroid which will contain both the 22α and 22β isomers. This mixture may be separated by conventional chromatographic techniques or, alternatively, the process may be continued using the mixture of 22β-hydroxy and 22α-hydroxy steroids with separation of the isomers performed at a later point.

Regeneration of the 6-keto group may be next accomplished, if desired, as with manganese dioxide or 2,3-dichloro-5,6-dicyanobenzoquinone, with cleavage of the 2β,3β-alkylidenedioxy function and, when $R^1$ is tetrahydropyranyloxy, this group as well, being realized through the action of acid, such as hydrochloric, oxalic or formic acid, preferably the former.

Alternatively, in another embodiment of the present invention, the 2β,3β-alkylidenedioxy-6,14α-dihydroxy-22, 23-bisnor-5β-chol-7-enoic acid alkyl ester is treated with the lithium salt of di(lower)alkylsulfoxide, and the resulting 2β,3β-alkylidenedioxy-6,14α-dihydroxy-23-(lower) alkylsulfinyl-24-nor-5β-chol-7-en-22-one optionally bearing an alkyl group in the 23-position ($R^8$) is treated with an alkyl haloacetate, such as for example, ethyl bromoacetate, thereby forming the 2β,3β-alkylidenedioxy-6,14α-dihydroxy - 22 - keto - 23 - (lower)alkylsulfinyl - 5β-chol-7-ene 25-carboxylic acid alkyl ester derivative. Treatment of this with aluminum amalgam, or the equivalent reactants described above, results in elimination of the alkylsulfinyl group, thereby forming 2β,3β-alkylidenedioxy-6,14α - dihydroxy - 22 - keto - 5β - chol - 7 - ene 25-carboxylic acid alkyl ester.

Upon reduction of this compound with a metal hydride such as lithium tri-t-butoxide aluminum hydride, there is directly formed a lactone, specifically a 2β,3β-alkyklidenedioxy - 6,14α,22 - trihydroxy - 5β - chol - 7 - ene 25-carboxylic acid 22-lactone. This reaction may be represented as follows:

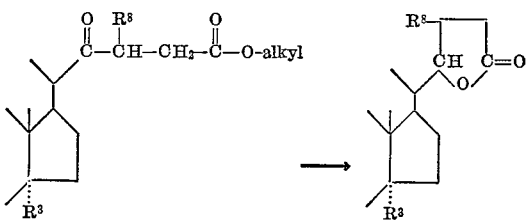

While this lactone is opened upon treatment of base, it is immediately reformed through simple acid treatment, such as with acetic acid.

The above lactone is treated with an organometallic alkylating agent, such as for example, alkyl lithium or alkyl magnesium halide. Thus, treatment with one mol of methyl lithium forms a 2β,3β-alkylidenedioxy-6,14α,22-trihydroxy-27-nor-5β-cholest-7-en-25-one derivative, and with a second mol of methyl lithium forms a 2β,3β-alkylidenedioxy - 6,14α,22,25 - tetrahydroxy - 5β - cholest - 7-ene derivative. The latter compound, when treated with manganese dioxide or with 2,3-dichloro-5,6-dicyanobenzoquinone is selectively oxidized to the corresponding 6-keto compound which, upon acid hydrolysis to cleave the alkylidenedioxy function, yields ecdysone, as well as its isomers. Separation of these isomers may be performed at this stage or, alternatively, at completion of any stage after and including alkylation of the lactone.

While the foregoing has been exemplified using a 2β,3β-alkylidenedioxy - 6,14α - dihydroxy - 22,23 - bisnorchol-7-enoic acid alkyl ester derivative, it is equally applicable to any of the derivatives falling within Formula II. Side chain variations and elaborations are thus generally performed with 22,23-bisnorcholanoic acid starting materials bearing the desired substituents or bearing groups readily convertible thereto, e.g., the 6-keto group is generally carried through as a 6-hydroxy group, either alpha or beta or a mixture thereof, the 2β,3β-diol system is preferably protected through formation of the alkylidenedioxy group, and so forth. In these compounds $R^7$ may be α-hydrogen, β-hydrogen or α-hydroxy, and $R^3$ may be hydroxy or hydrogen. Preparations of such starting materials are described in the copending applications set forth above. Likewise, variations may be made in the reagents employed in the process of the present invention. Use, for example, of ethyl lithium in place of methyl lithium yields 2β,3β - alkylidenedioxy - 6,14α,22,25 - tetrahydroxy - 26, 27-dimethyl-5β-cholest-7-ene, which may be processed as described above. Similarly, use of diethylsulfoxide in place of dimethylsulfoxide forms the corresponding 23-methyl derivatives, whereas use of an alkyl ester of α-bromopropionic acid forms the corresponding 24-methyl derivatives. These variations may be used singularly or in combination.

Alternatively, side chain extension, either in part or in whole, may be performed prior to extensive elaboration of the steroid nucleus. One particularly valuable class of derivatives in this embodiment is that represented by compounds having the 22-hydroxycholane 25-carboxylic acid lactone structure.

In this approach, a 3β-hydroxychol-5-enoic acid alkyl ester [or, alternatively, the corresponding 3-(tetrahydropyran-2-yl)ether thereof] is treated with the lithium salt of a dialkylsulfoxide, as for example dimethylsulfoxide, according to the method of this example. The resulting sulfinyl derivative, such as 3β-hydroxy-23-methylsulfinyl-24-norchol-5-en-22-one is then subjected to the action of an alkyl α-haloalkanoate, such as ethyl bromoacetate, to yield 3β - hydroxy - 23 - methylsulfinylchol - 5-ene 25-carboxylic acid ethyl ester. Treatment with aluminum amalgam followed by reduction with tri-t-butoxy aluminum hydride in the manner previously described then yields 3β,22-dihydroxylchol-5-ene 25-carboxylic acid 22-lactone. When the original starting material bears a 3-tetrahydropyranyl ether, it is preferably removed at this stage through treatment with acid, and the free 3β-hydroxy group then acylated. If not removed, the tetrahydropyranyl ether will be cleaved in the subsequent steps in any event. The lactone, as is its 3-acylate, is then subjected to the reaction sequence previously described for the 3β-acyloxy-22,23-bisnorchol-5-enoic acid alkyl ether, thus yielding upon completion of the last steps (formation of the 2β,3β-alkylidenedioxy derivative and reduction of the 6-keto group), 2β,3β-alkylidenedioxy-6,14α,22-trihydroxy-5β-chol-7-ene 25-carboxylic acid 22-lactone, which may be further processed as previously described to yield ecdysone. Thus, the 3β-acyloxy-22-hydroxychol-5-ene 25-carboxylic acid 22-lactone is treated with hot formic acid and hydrogen peroxide as previously described. Subsequent alkaline hydrolysis followed by brief acid treatment then yields the 3β,5α,6β,22-tetrahydroxy-5α-cholane 25-carboxylic acid 22-lactone, which is oxidized with N-bromosuccinimide to yield the corresponding 6-keto compound. Dehydration through selective formation of a 3-tosylate, followed by treatment with base and subsequent brief acid treatment, yields 5α,22-dihydroxy - 6 - ketochol - 2-ene 25-carboxylic acid 22-lactone, which is converted to the 2β,3β-diacylate in the manner previously described. Introduction of the Δ⁷ double bond is accomplished through α-bromination and dehalogenation to yield the 2β,3β-diacyloxy-5α,22-dihydroxy-6-ketochol-7-ene 25-carboxylic acid 22-lactone which may contain small amounts of the Δ⁸⁽¹⁴⁾ isomer, readily separable at this stage or later through chromatographic techniques. The 2β,3β,5α-triacylate is next obtained by conventional esterification, and a 14α-hydroxyl function is then introduced, if desired, directly through the action of selenium dioxide. The 5α-acyloxy group is next selectively removed from this 14α-hydroxy-6-keto triacylate, if desired, by treatment with chromous chloride, thus affording the 2β,3β - diacyloxy - 14α,22-dihydroxy-6-keto-5α-chol-7-ene 25-carboxylic acid 22-lactone. The order of these last two steps may be reversed. Alkaline hydrolysis of the 2β,3β-diacyloxy group, followed in the case of 5α-desoxy compounds by inversion of the configuration in the 5α-position as with potassium carbonate, yields the corresponding 2β,3β-dihydroxy-5α-steroid and the 2β,3β-dihydroxy-5β-steroid, respectively. The free 2β,3β-dihydroxy-5-steroid is then converted to the 2β,3β-alkylidenedioxy derivative, namely the 2β,3β - alkylidenedioxy - 6 - keto-14α,22-dihydroxychol-7-ene 25-carboxylic acid 22-lactone. The 6-keto group is then reduced as with sodium borohydride, lithium aluminum tri(t-butoxide)hydride, or the like, to give a mixture of 6α- and 6β-hydroxy compounds which may be separated through chromatography or subjected to the next step as a mixture.

Alternatively, lactone formation may be performed in the same manner as described above, after formation of the 3β,5α,6β - trihydroxy - 22,23-bisnor-5α-cholanoic acid alkyl ester. The resulting 3β,5α,6β,22 - tetrahydroxy - 5α-cholane 25-carboxylic acid 22-lactone is then further processed as already described.

The following examples will serve to further typify the nature of the present invention, but should not be construed as a limitation thereof.

EXAMPLE 1

Fifty grams of 3β-acetoxy-22,23-bisnorchol-5-enoic acid methyl ester are dissolved in 500 ml. of hot (88%) formic acid and held at about 70° C. for about 0.5 hour. Thereafter, the solution is cooled to about 20° C. and 60 ml. of (30%) hydrogen-peroxide is added cautiously. The resulting mixture is stirred for two hours, whereupon about 750 ml. of hot water is added. A gum is formed which is separated by decantation and filtration. The crude product is washed with water and dissolved in 800 ml. of hot methanol which contains a mixture of 38 g. of potassium hydroxide and 65 ml. of water. Saponification to the triol is complete after approximately two minutes. Neutralization of the solution with acetic acid followed by dilution with cold water results in the formation of a solid which is filtered and dried, affording 3β,5α,6β-trihydroxy-22,23-bisnorcholanoic acid methyl ester.

A solution containing 50 g. of 3β,5α,6β-trihydroxy-22,23-bisnorcholanoic acid methyl ester in aqueous dioxane (50 ml. water, 450 ml. dioxane) is treated at about 20° C. with 29 g. of N-bromosuccinimide (1.25 mols). The oxidation is complete after about 1.5 hours, whereupon excess N-bromosuccinimide is decomposed by the addition of aqueous sodium sulfite until the solution is substantially colorless. The addition of about 1.2 liters of cold water to the solution results in the formation of a white solid. The mixture is cooled in ice and the solid is collected by filtration and dried by suction to yield 3β,5α - dihydroxy - 6-keto - 22,23 - bisnorcholanoic acid methyl ester.

To a stirred solution of 38 g. of 3β,5α-dihydroxy-6-keto-22,23-bisnorcholanoic acid methyl ester in 150 ml. of pyridine, cooled to 0° C., is added 50 g. of p-toluenesulfonyl chloride. The mixture is allowed to stand at about 20° C. for about 16 hours and is then diluted slowly by the addition of water while cooling in an ice bath, whereupon a solid precipitates. The thus-formed solid is separated, washed with water to remove pyridine and is dried, thus yielding 5α-hydroxy-6-keto-3β-p-toluenesulfonyloxy - 22,23 - bisnorcholanoic acid methyl ester, which may be further purified through recrystallization from methylene chloride:hexane.

To a mixture of 18 g. of lithium carbonate and 210 ml. of dimethyl acetamide at about 150° C. under nitrogen are added quickly 30 g. of the foregoing crystallized tosylate derivative. The mixture is maintained at a temperature of approximately 150° C. for 10 minutes and is then cooled rapidly to about 0° C. The cooled mixture is added to cold water, yielding a solid which is collected by filtration, dried and extracted with benzene:water. These extracts are concentrated to give 5α-hydroxy-6-keto-22,23-bisnorchol-2-enoic acid methyl ester, which is recrystallized from methylene chloride:hexane.

To a stirred mixture containing 326 mg. of 5α-hydroxy-6-keto-22,23-bisnorchol-2-enoic acid methyl ester, 10 ml. of dry acetic acid and 260 mg. of iodine is added 167 mg. of dry silver acetate, portionwise, over a one-hour period. Stirring is continued for approximately six hours, whereupon the reaction mixture is taken up in methylene chloride, filtered, and washed with aqueous sodium thiosulfate and water. The methylene chloride is evaporated in vacuo at room temperature and the residue therefrom is treated with excess silver nitrate and 10% aqueous methanol for approximately 10 minutes at about 70° C. The resulting reaction mixture is cooled, filtered, and the filtrate is taken up in methylene chloride. This organic solution is washed with water and evaporated under vacuum. The thus-obtained crude product is chromatographed on silica gel, eluting with ethyl acetate:hexane mixtures. The desired 2β,3β,5α-trihydroxy-6-keto-22,23-bisnorcholanoic acid methyl ester is obtained by mild alkaline hydrolysis of the most polar of the products from the column.

A mixture containing 170 mg. of 2β,3β,5α-trihydroxy-6-keto-22,23-bisnorcholanoic acid methyl ester and 2 ml. of 3:7 acetic anhydride:pyridine is allowed to stand at 90° C. for about three hours. The mixture is then concentrated to dryness under vacuum to afford 2β,3β-diacetoxy - 5α - hydroxy-6-keto-22,23-bisnorcholanoic acid methyl ester, which is recrystallized from methanol.

EXAMPLE 2

A solution containing 3.8 g. of 2β,3β-diacetoxy-5α-hydroxy-6-keto-22,23-bisnorcholanoic acid methyl ester, 16 ml. of acetic acid, 2.4 ml. of 15% hydrogen bromide in acetic acid, and 9 ml. of bromine in acetic acid (127 mg. of bromine per ml. of acetic acid) is stirred at room temperature for four hours. Thereafter, excess bromine is decomposed by the addition of 2% aqueous sodium sulfite, and approximately 150 ml. of water is then added to complete precipitation. Filtration and drying by suction yields 7α-bromo-2β,3β-diacetoxy-5α-hydroxy-6-keto-22,23-bisnorcholanoic acid methyl ester which is recrystallized from methylene chloride:methanol.

A mixture of 450 mg. of this 7α-bromo steroid (VI), 12 ml. of dimethyl acetamide and 400 mg. of lithium carbonate is refluxed under an atmosphere of nitrogen for 12 minutes and thereafter is rapidly cooled in an ice bath. The reaction mixture is washed, filtered, and the filtrate is extracted with methylene chloride. The methylene chloride extracts are thereafter washed with water and saturated sodium chloride solution and concentrated in vacuo to yield 2β,3β-diacetoxy-5α-hydroxy-6-keto-22,23-bisnorchol-7-enoic acid methyl ester and 2β,3β-diacetoxy-5α-hydroxy-6-keto-22,23-bisnorchol-8(14)-enoic acid methyl ester. These compounds may be separated at this point by chromatography on silica gel. Alternatively, the mixture may be carried forward and separated at a later stage.

A solution containing 5 ml. of acetic acid, 2 ml. of acetic anhydride and 450 mg. of 2β,3β-diacetoxy-5α-hydroxy-6-keto-22,23-bisnorchol-7-enoic acid methyl ester and 100 mg. of p-toluenesulfonic acid is stirred at room temperature for 3.5 hours and then added cautiously to dilute aqueous potassium bicarbonate and subjected to extraction with methylene chloride. The methylene chloride extracts are thereafter washed with water and saturated sodium chloride solution and concentrated to dryness under vacuum, yielding 6-keto-2β-3β-5α-triacetoxy-22,23-bisnorchol-7-enoic acid methyl ester.

This triacetate may also be obtained from the triol by successive acid-catalyzed acetylation, halogenation and dehydrohalogenation.

EXAMPLE 3

A mixture containing 140 mg. of selenium dioxide, 10 ml. of dry dioxane, and 265 mg. of 6-keto-2β-3β-5α-triacetoxy-22,23-bisnorchol-7-enoic acid methyl ester is refluxed for four hours. Thereafter, the reaction mixture is cooled, filtered, and the filtrate is washed with dilute aqueous potassium bicarbonate and extracted with methylene chloride. The methylene chloride extracts are washed with saturated sodium chloride solution, dried and filtered through Celite diatomaceous earth. The filtrate is concentrated to dryness, affording 14α-hydroxy-6 - keto-2β,3β,5α-triacetoxy-22,23-bisnorchol-7-enoic acid methyl ester.

EXAMPLE 4

To a solution of 90 mg. of 14α-hydroxy-6-keto-2β,3β,5α-triacetoxy-22,23-bisnorchol-7-enoic acid methyl ester and 5 ml. of acetone is added 4 ml. of a 25% solution of chromous chloride in 1 N hydrochloric acid. The solution is allowed to stand for two minutes, whereupon it is poured into a water:methylene chloride mixture. The organic layer is separated and washed successively with dilute aqueous potassium bicarbonate, water, and saturated sodium chloride solution, dried over sodium sulfate, and concentrated to dryness, thus yielding 2β,3β-diacetoxy - 14α - hydroxy-6-keto-22,23-bisnor-5α-chol-7-enoic acid methyl ester.

EXAMPLE 5

A mixture of 1 g. of 2β,3β-diacetoxy-14α-hydroxy-6-keto-22,23-bisnor-5α-chol-7-enoic acid methyl ester, 0.33 g. of potassium carbonate, and 100 ml. of 90% aqueous methanol is allowed to stand for approximately one hour at room temperature. Thereafter, ethyl acetate and saturated sodium chloride solution are added to the mixture and the layers are separated. The organic layer is neutralized, washed with water, dried over sodium sulfate and concentrated to dryness at room temperature to yield 2β,3β,14α - trihydroxy - 6 - keto - 22,23 - bisnor - 5α - chlo-7-enoic acid methyl ester.

EXAMPLE 6

A mixture containing 1 g. of 2β,3β,14α-trihydroxy-6-keto-22,23-bisnor-5α-chol-7-enoic acid methyl ester, 0.33 g. of potassium carbonate, and 100 ml. of 90% aqueous methanol is allowed to stand for approximately 20 hours at room temperature. The product is recovered by extraction with ethyl acetate in the manner described in the preceding paragraph and consists of a mixture of 2β,3β,14α-trihydroxy - 6 - keto - 22,23 - bisnor - 5β - chol - 7 - enoic acid methyl ester and the 5α epimer which are separated by chromatography. The 5α epimer may be recycled for further preparation of the 5β compound.

EXAMPLE 7

A mixture containing 0.5 g. of 2β,3β,14α-trihydroxy-6-keto-22,23-bisnor-5β-chol-7-enoic acid methyl ester, 30 ml. of acetone, and 50 mg. of p-toluenesulfonic acid is allowed to stand at room temperature for approximately two hours. The reaction mixture is thereafter poured into cold, saturated aqueous potassium bicarbonate solution and extracted with ethyl acetate. The ethyl acetate extracts are washed with water to neutrality, dried over sodium surface and concentrated to dryness at room temperature to yield 2β,3β - isopropylidenedioxy - 14α - hydroxy - 6 keto - 22,23-bisnor 5-β-chol-7-enoic acid methyl ester.

A mixture of 1 g. of this product, 100 ml. of anhydrous tetrahydrofuran, and 2 g. of lithium aluminum tri-(t-butoxy) hydride is stirred at reflux for approximately two hours. The reaction mixture is stirred with ethyl acetate and then with saturated sodium chloride solution. The mixture is next filtered and the filtrate is extracted with ethyl acetate. The ethyl acetate extracts are washed with water, dried over sodium sulfate, and concentrated to dryness under vacuum to yield 2β,3β-isopropylidenedioxy-6,14α-dihydroxy-22,23-bisnor-5β-chloro-7-enoic acid methyl ester, which may be separated into the 6α and 6β isomers or may be used as a mixture of the two.

EXAMPLE 8

To 780 mg. of 2β,3β-isopropylidenedioxy-6,14α-dihydroxy-22,23-bisnor 5β-chol-7-enoic acid methyl ester in 15 ml. of tetrahydrofuran under nitrogen at 0° C. is added 100 mg. of sodium hydride. After stirring this mixture for two hours, 82.0 ml. of a suspension of the lithium salt of 1 - phenylsulfinyl - 3 - methyl - 3 - tetrahydropyranyloxylbutane, prepared as below, are added. This mixture is stirred for 17 hours at 0° C., diluted with 800 ml. of water and extracted five times with 150 ml. portions of methylene chloride. The combined organic layers are washed thrice with 500 ml. portions of saturated sodium chloride solution, dried over sodium sulfate and evaporated in vacuo. The residue is chromatographed on silica, eluting with 20:1 chloroform:methanol, to yield 2β,3β isopropylidenedioxy-6,14α- dihydroxy-23-phenylsulfinyl-25-tetrahydropyranyloxy-5β-cholest-7-en-22-one, which is subjected to the following procedure without further purification.

To a solution of this steroid (650 mg.) in 45 ml. of 9:1 tetrahydrofuran:water are added aluminum amalgam, prepared by dipping 400 mg. of 1 cm.² pieces of aluminum foil in a 2% aqueous solution of mercuric chloride for 10 seconds and rising with ethanol and ether. After stirring for 90 minutes, the mixture is filtered, diluted with 600 ml. of water and extracted five times with 150 ml. portions of methylene chloride. The combined extracts are washed twice with 250 ml. portions of water and 500 ml. of saturated sodium chloride solution. After drying over sodium sulfate, the solution is evaporated in vacuo to yield 2β,3β-isopropylidenedioxy - 6,14α - dihydroxy - 25 - tetrahydropyranyloxy-5β-cholest-7-en-22-one.

The requisite lithium salt of 1-phenylsulfinyl-3- methyl-3-tetrahydropyranyloxylbutane may be prepared as follows. To a solution of 110 g. of thiophenol and 54 g. of the sodium methoxide in 500 ml. of dry method are added under nitrogen with the stirring, 251 g. of 1-bromo-3-methyl-3-tetrahydropyanyloxybutane. The mixture is stirred for 16 hours, diluted with 4 liters of water and extracted five times with 500 ml. portions of ethyl ether. The combined organic extracts are washed with water, 3% aqueous sodium hydroxide solution and with saturated aqueous sodium chloride solution. After drying the solution over sodium sulfate, the mixture is evaporated. A solution of 140 g. of this intermediate sulfide in 1.5 liters of 50% aqueous methanol is added at 5° C. to 107 g. of sodium iodate in 1.5 liters of 50% aqueous methanol. This mixture is stirred at about 0° C. for 3.5 hours and filtered. The filtrate is diluted with 6 liters of water and extracted six times with 400 ml. portions of methylene chloride. The combined organic extracts are washed twice with 2 liters of saturated sodium chloride solution, dried over sodium sulfate, and evaporated to yield 1-phenylsulfinyl-3-methyl-3-tetrahydropyranyloxybutane which, after chromatography on silica with 1:1 hexane:ethyl acetate, is injected (39.28 g.) as a tetrahydrofuran solution (300 ml.) into 0.6 g. of sodium hydride under nitrogen. After stirring for one hour, 80 ml. of a 1.5 M solution of phenyl lithium in ether is added at 0° C. After stirring for 15 hours, this mixture is ready for use as described above.

EXAMPLE 9

A mixture containing 1 g. of 2β,3β-isopropylidenedioxy - 6,14α-hydroxy-25-tetrahydropyranyloxy-5β-cholest-7-en-22-one, 100 ml. of anhydrous tetrahydrofuran, and 2 g. of lithium aluminum hydride is stirred at room temperature for approximately six hours. The reaction mixture is then diluted with ethyl acetate and saturated aqueous sodium chloride solution, filtered and extracted with ethyl acetate. These extracts are washed with water, dried over sodium sulfate, and concentrated to dryness under vacuum, yielding a mixture of 2β,3β-isopropylidenedioxy - 6,14α,22β - trihydroxy - 25 - tetrahydropyranyloxy-5β-cholest-7-ene and the corresponding 22α isomer. The mixture may be separated at this point by chromatography on silica gel or, alternatively, at a later stage in the synthesis.

EXAMPLE 10

To a mixture of 1 g. of 2β,3β-isopropylidenedioxy-6,14α,22β - trihydroxy-25-tetrahydropyranyloxy-5β-cholest-7-ene in 100 ml. of 1:1 chloroform:benzene is added 2.5 ml. of isopropanol followed by 10 g. of manganese dioxide. This mixture is stirred for 90 minutes, filtered, and the filtrate evaporated to dryness. The residue is purified by chromatography to yield 2β,3β-isopropylidenedioxy-14α,22β - dihydroxy-25-tetrahydropyranyloxy-5β-cholest-7-en-6-one.

EXAMPLE 11

A mixture containing 1 g. of 2β,3β-isopropylidenedioxy - 14α,22β - dihydroxy - 25 - tetrahydropyranyloxy-5β-cholest-7-en-6-one, 90 ml. of 80% aqueous tetrahydrofuran, and 9 ml. of 1 N hydrochloric acid is allowed to stand at room temperature for about three hours. The reaction mixture is then washed to neutrality with potassium bicarbonate and extracted with ethyl acetate. The combined ethyl acetate extracts are washed with water, dried over sodium sulfate, and concentrated to dryness to yield 2β,3β,14α,22β,25-pentahydroxy-5β-cholest- 7-en-6-one whose physical constants, after chromatography on silica with 9:1 chloroform:methanol, are in agreement with those reported in the literature.

EXAMPLE 12

A mixture containing 265 mg. of 2β,3β-diacetoxy-5α-hydroxy-6-keto-22,23-bisnorchol-7-enoic acid methyl ester, 140 mg. of selenium dioxide and 10 ml. of dry dioxane is refluxed for approximately four hours. The mixture is then cooled, filtered, and the filtrate washed with dilute aqueous potassium bicarbonate and extracted with methylene chloride. The methylene chloride phase is washed with saturated aqueous sodium diatomaceous earth. The filtrate is concentrated to dryness, affording 2β,3β-diacetoxy-5α,14α-dihydroxy-6-keto-22,23-bisnorchol-7-enoic acid methyl ester.

Upon subjecting this compound to the hydrolysis procedure described in Example 5, there is obtained 2β,3β,5α,14α-tetrahydroxy-6-keto-22,23-bisnorchol-7-enoic acid methyl ester. This compound is then sequentially treated according to the procedures described in Examples 7 through 11, thereby forming as the final product, 2β,3β,5α,14α,22β,25-hexahydroxycholest-7-en-6-one.

EXAMPLE 13

In a similar fashion to that described in the last paragraph of Example 12, 2β,3β-diacetoxy-5α-hydroxy-6-keto-22,23-bisnorchol-7-enoic acid methyl ester is hydrolyzed according to the procedure of Example 5, and the resulting 2β,3β,5α-trihydroxy compound is then utilized in the procedures of Examples 7 through 11, sequentially, thereby yielding upon completion of the last step, 2β,3β,5α,22β,25-pentahydroxycholest-7-en-6-one.

EXAMPLE 14

6-keto-2β,3β,5α-triacetoxy-22,23-bisnorchol-7-enoic acid methyl ester is subjected sequentially to the procedures described in Examples 4 through 11, and upon completion of the steps therein described there is obtained 2β,3β,22β,25-tetrahydroxy-5β-cholest-7-en-6-one.

EXAMPLE 15

2β,3β-isopropylidenedioxy-6,14α-dihydroxy-25-tetrahydropyranyloxy-5β-cholest-7-en-22-one is subjected to the procedure of Examples 10 and 11 in that order, and there is thus obtained 2β,3β,14α,25-tetrahydroxy-5β-cholest-7-ene-6,22-dione. Alternatively, by subjecting this same starting material to only the procedure of Example 11, there is obtained a mixture of 2β,3β,6α,14α,25-pentahydroxy-5β-cholest-7-en-22-one and 2β,3β,6β,14α,25-pentahydroxy-5β-cholest-7-en-22-one, which may be separated by chromatography.

EXAMPLE 16

By subjecting 2β,3β,14α-trihydroxy-6-keto-22,23-bisnor-5α-chol-7-enoic acid methyl ester to the procedures described in Examples 7 through 11, there is obtained 2β,3β,14α,22β,25-pentahydroxy-5α-cholest-7-en-6-one.

EXAMPLE 17

By employing 1-phenylsulfinyl-3,3-dimethylbutane in place of 1-phenylsulfinyl-3-methyl-3-tetrahydropyranyloxybutane in the procedure of Example 8, and thereafter performing the procedures of Examples 9 through 11 in their given order, there is obtained 2β,3β,14α,22β-tetrahydroxy-25-methyl-5β-cholest-7-en-6-one.

Similarly, by use of propylphenylsulfoxide and isobutylphenylsulfoxide, there are respectively obtained according to this reaction sequence, 2β,3β,14α,22β-tetrahydroxy-26,27-bisnor-5β-cholest-7-en-6-one and 2β,3β,14α,22β-tetrahydroxy-24-methyl-26,27-bisnor-5β-cholest-7-en-6-one.

EXAMPLE 18

To 660 mg. of sodium hydride paste which has been previously washed well with hexane and dried under nitrogen, are added under nitrogen 10 ml. of dimethylsulfoxide. The suspension is heated at 65° C. for 90 minutes, cooled to about 25° C., and 0.03 ml. of the reagent is added to a stirred solution of 4.5 mg. of 2β,3β-isopropylidenedioxy-6,14α-dihydroxy-22,23-bisnor-5β-chol-7-enoic acid methyl ester in 0.5 ml. of dry tetrahydrofuran and 0.3 ml. of dimethylsulfoxide, which is held under nitrogen. This mixture is stirred for 30 minutes at room temperature and then cautiously decomposed by the addition of water and extracted several times with methylene chloride. These extracts are washed with water and saturated sodium chloride solution, dried over sodium sulfate and evaporated to dryness to yield 2β,3β-isopropylidenedioxy-6,14α-dihydroxy-23-methylsulfinyl-24-nor-5β-chol-7-en-22-one.

By utilizing diethylsulfoxide in the foregoing procedure, there is obtained 2β,3β-isopropylidenedioxy-6,14α-dihydroxy-23-ethylsulfinyl-5β-chol-7-en-22-one.

Alternatively, by using 2β,3β-isopropylidenedioxy-6-hydroxy-22,23-bisnor-5β-chol-7-enoic acid methyl ester and 2β,3β-isopropylidenedioxy-6,14α-dihydroxy-22,23-bisnor-5α-chol-7-enoic acid methyl ester, there are respectively obtained 2β,3β-isopropylidenedioxy-6-hydroxy-23-methylsulfinyl-24-nor-5β-chol-7-en-22-one and 2β,3β-isopropylidenedioxy-6,14α-dihydroxy-23-methylsulfinyl-24-nor-5α-chol-7-en-22-one.

EXAMPLE 19

Upon treatment of 2β,3β-isopropylidenedioxy-6,14α-dihydroxy-23-methylsulfinyl-24-nor-5β-chol-7-en-22-one with aluminum amalgam, as described in Example 8, there is obtained 2β,3β-isopropylidenedioxy-6,14α-dihydroxy-24-nor-5β-chol-7-en-22-one.

Similarly obtained are 2β,3β-isopropylidenedioxy-6-hydroxy-24-nor-5β-chol-7-en-22-one and 2β,3β-isopropylidenedioxy-6,14α-dihydroxy-24-nor-5α-chol-7-en-22-one.

EXAMPLE 20

A mixture of 0.4 g. of 2β,3β-isopropylidenedioxy-6,14α-dihydroxy-24-nor-5β-chol-7-en-22-one, 15 ml. of tetrahydrofuran, 3 g. of 1-bromo-4,4-dimethylbutane and 0.3 g. of magnesium metal is stirred overnight. Methylmagnesium chloride may be added if scratching or breaking a piece of the metal does not initiate the reaction. The mixture is filtered at the end of the reaction time and cautiously treated with saturated ammonium chloride solution and extracted with ethyl acetate. These extracts are washed with sodium chloride solution and water, dried and evaporated to dryness to yield 2β,3β-isopropylidenedioxy-6,14α,22-trihydroxy-22,25-dimethyl-5β-cholest-7-ene. Successive treatment with manganese dioxide and hydrochloric acid as described in Examples 10 and 11, respectively, yields 2β,3β,14α,22-tetrahydroxy-22,25-dimethyl-5β-cholest-7-en-6-one.

EXAMPLE 21

To a solution of 17 mg. of potassium t-butoxide in 2 ml. of dimethylsulfoxide are added 25 mg. of 2β,3β-isopropylidenedioxy-6,14α-dihydroxy-23-methylsulfinyl-24-nor-5β-chol-7-en-22-one under nitrogen. The mixture is stirred for 30 minutes, and 21 mg. of bromoacetone are then added. This mixture is stirred for 2.5 hours and then neutralized by the addition of acetic acid. This mixture is extracted with methylene chloride, and these extracts are washed with water and dried. Upon evaporation of the solvent there is obtained 2β,3β-isopropylidenedioxy-6,14α-dihydroxy-23-methylsulfinyl-27-nor-5β-cholest-7-ene-22,25-dione. Upon subjecting this compound to the action of aluminum amalgam as described in Example 8 and thereafter reducing the desulfinylated product as described in Example 9, there is obtained 2β,3β-isopropylidene-6,14α,22,25-tetrahydroxy-27-nor-5β-cholest-7-ene, which is converted to 2β,3β,14α,22,25-pnetahydroxy-27-nor-5β-cholest-7-en-6-one via the procedures of Examples 10 and 11.

EXAMPLE 22

By repeating the initial procedure of Example 21, using, however, 28 mg. of potassium t-butoxide, there is obtained 2β,3β - isopropylidenedioxy - 6,14α,25 - trihydroxy-23,26-sulfinyl-5β-cholest-7-en-22-one. Upon treatment with aluminum amalgam as described in Example 8, there is obtained 2β,3β - isopropylidenedioxy - 6,14α,25 - trihydroxy-26-mercapto-5β-cholest-7-en-22-one.

To a solution of 100 mg. of 2β,3β - isopropylidenedioxy - 6,14α,25 - trihydroxy - 26 - mercapto-5β-cholest-7-en-22-one in 50 ml. of ethanol are added 50 mg. of Raney nickel. The mixture is stirred at room temperature for 30 minutes and then filtered, the filtrate being washed well with ethanol. The combined filtrates are evaporated to dryness and the residue is dissolved in methanol, cooled to 0° C., and treated with an equal weight of sodium borohydride. The mixture is then allowed to stand at room temperature for 15 hours and then cautiously treated with acetic acid and concentrated to a small volume. This concentrate is extracted with ethyl acetate, and these extracts are washed with water, dried and evaporated to yield 2β,3β - isopropylidenedioxy - 6,14α,22,25 - tetrahydroxy-5β-cholest-7-ene, which is selectively oxidized and hydrolyzed as previously described to yield 2β,3β,14α,22,25-pentahydroxy-5β-cholest-7-en-6-one.

EXAMPLE 23

By following Example 21, using, however, 26 mg. of ethyl bromoacetate in place of bromoacetone, there is obtained upon completion of the procedures therein described 2β,3β - isopropylidenedioxy - 6,14α - dihydroxy-22 - keto - 23 - methylsulfinyl - 5β - chol - 7 - ene 25-carboxylic acid ethyl ester, which is converted to 2β,3β-isopropylidenedioxy - 6,14α - dihydroxy - 22 - keto - 5β-chol-7-ene 25-carboxylic acid ethyl ester by the action of aluminum amalgam. Reduction as described in Example 9, followed by oxidation according to the procedure of Example 10 and hydrolysis as described in Example 11, yields 2β,3β,14α,22,25 - pentahydroxy - 26,27 - bisnor-5β-cholest-7-en-6-one.

If the procedure of Example 21 is followed using ethyl bromoacetate as herein described and further employing 28 mg. of potassium butoxide, there is initially obtained 2β,3β - isopropylidenedioxy - 6,14α - dihydroxy - 23,26-sulfinyl - 27 - nor - 5β - cholest - 7 - ene - 22,25 - dione, which when treated with aluminum amalgam yields 2β, 3β - isopropylidenedioxy - 6,14α - dihydroxy - 27 - nor-5β-cholest-7-ene-22,25-dione. Upon reduction of the keto groups, selective oxidation of the 6-hydroxy group and hydrolysis as described in Examples 9–11, respectively, there is obtained 2β,3β,14α,22,25 - pentahydroxy-27-nor-5β-cholest-7-en-6-one.

EXAMPLE 24

Fifteen grams of 3β-hydroxy-23-methylsulfinyl-24-norchol-5-en-22-one (obtained from 3β-hydroxy-23,24-bisnorchol-5-enoic acid methyl ester according to the initial procedure of Example 18) in 250 ml. of dimethylsulfoxide is treated with 8.45 g. of potassium t-butoxide. After five minutes, 6.4 ml. of methyl bromoacetate are then added over a 30-minute period. The mixture is stirred for one additional hour and then neutralized with acetic acid, diluted with water and extracted with methylene chloride. These extracts are dried and concentrated to yield 3β-hydroxy-22-keto-23-methylsulfinylchol-5-ene 25-carboxylic acid methyl ester. This material is dissolved in 10% aqueous tetrahydrofuran and is treated over a 30-minute period with 9 g. of aluminum foil which has been amalgamated as described in Example 8. After stirring for 1.5 to 2 hours, the mixture is filtered. The filtrate is treated with 4.4 g. of sodium borohydride and stirred for four hours. At the end of this time, the excess reagent is decomposed by the addition of acetic acid and the mixture is concentrated. After dilution with water, the mixture is extracted several times wih ethyl acetate. These extracts are dried and concentrated to dryness and the solid thus obtained is dissolved in chloroform. The insoluble materieal is removed by filtration and the filtrate is concentrated to dryness. The residue is chromatographed on silica gel, eluting with 7:3 ethyl acetate: hexane, to yield 3β,22-dihydroxychol-5-ene 25-carboxylic acid 22-lactone, which is further purified by recrystallization from methanol, M.P. 241–243° C.

This material is heated at steam bath temperature for one hour with 5 ml. of acetic anhydride and 10 ml. of pyridine. At the end of this time, the mixture is poured into water and this aqueous mixture is extracted with methylene chloride. These extracts are dried over sodium sulfate and evaporated to dryness to yield 3β-acetoxy-22-hydroxychol-5-ene 24-carboxylic 22-lactone.

This compound is substituted for 3β-acetoxy-22,23-bisnorchol-5-enoic acid methyl ester in Example 1, and the procedures recited in Example 1 through Example 7 are then executed sequentially. Upon completion of the steps therein described, there is obtained 2β,3β-isopropylidenedioxy - 6,14α,22 - trihydroxy - 5β - chol - 7 - ene 25-carboxylic acid 22-lactone (which may alternatively be obtained from 2β,3β-isopropylidenedioxy - 6,14α - dihydroxy-22, 23-bisnor-5β-chol-7-enoic acid methyl ester by treatment according to the initial procedures of this example).

A solution of 34.0 mg. of 2β,3β-isopropylidenedioxy-6,14α,22-trihydroxy-5β-chol-7-ene 25-carboxylic acid 22-lactone in dry 1:1 ethyl ether:tetrahydrofuran is treated with 3.5 ml. of 3.0 M solution of methylmagnesium chloride in tetrahydrofuran. After 45 minutes, an additional 1 ml. of Grignard reagent is added and the mixture is stirred for 60 minutes further. At the end of this time, the reaction mixture is decomposed by the addition of 0.6 N hydrochloric acid and extracted with ethyl acetate. These extracts are washed with sodium bicarbonate solution and saturated sodium chloride solution and dried. Upon evaporation of the solvent there is obtained 2β,3β - isopropylidenedioxy - 6,14α,22,25 - tetrahydroxy-5β-cholest-7-ene. Upon selective oxidation of the 6-hydroxy group and hydrolysis of the 2β,3β-isopropylidenedioxy group, there is obtained 2β,3β, 14α,22,25-pentahydroxy-5β-cholest-7-en-6-one.

EXAMPLE 25

Fifty milligrams of 3β-hydroxy-22-keto-23-methylsulfinylchol-5-ene 25-carboxylic acid methyl ester and 25 mg. of Raney nickel are added to 25 ml. of acetone. The mixture is stirred for 10 minutes, filtered and evaporated to dryness to yield 3β-hydroxy-22-ketochol-5-ene 25-carboxylic acid and methyl ester, which is employed as described in Example 24.

EXAMPLE 26

A solution of 189 mg. of dimethylsulfone in 4 ml. of dry tetrahydrofuran is treated at 0° C. under a dry nitrogen atmosphere with 2 ml. of a 2-molar solution of phenyl lithium in benzene and ether. After stirring this mixture for eight hours at about 0° C., it is added to a stirred solution of 240 mg. of 3β-hydroxy-22,23-bisnorchol-5-enoic acid methyl ester in 3 ml. of dry tetrahydrofuran at 0° C. to 5° C. After stirring this mixture for five hours, it is diluted with water and extracted with methylene chloride. These extracts are washed with water, dried over sodium sulfate and evaporated to yield 3β-hydroxy-23-methylsulfonyl-24-norchol-5-en-22-one.

In a like fashion, by employing 248 mg. of thioanisole and 274 mg. of N,N-diethyl methanesulfonamide in place of dimethylsulfone in the foregoing procedure, there are respectively obtained 3β-hydroxy-23-phenylthio-24-norchol-5-en-22-one and 3β-hydroxy-23-diethylaminosulfonyl-norchol-5-en-22-one.

By subjecting 3β-hydroxy-23-methylsulfonyl-24-norchol-4-en-22-one to the action of methyl bromoacetate under basic conditions as described in the initial procedure of Example 24, there is obtained 3β-hydroxy-22-keto - 23 - methylsulfonylchol-5-ene 25-carboxylic acid methyl ester. Similarly obtained are 3β-hydroxy-22-keto-23-phenylthiochol-5-ene 25-carboxylic acid methyl ester and 3β - hydroxy - 22 - keto - 23 - diethylaminosulfonyl-chol-5-ene 25-carboxylic acid methyl ester.

EXAMPLE 27

A solution of 536 mg. of 3β-hydroxy-22-keto-23-phenylthiochol-5-ene 25-carboxylic acid methyl ester in 10 ml. of glacial acetic acid is stirred with 250 mg. of zinc dust at 20° C. for 30 minutes. At the end of this time, the mixture is filtered and poured into water. This mixture is extracted with ether, and these extracts are washed with water, dried and evaporated to dryness to yield 3β-hydroxy-22-ketochol-5-ene 25-carboxylic acid methyl ester.

The same product is obtained upon subjecting 3β-hydroxy - 22 - keto - 23 - methylsulfonylchol - 5 - ene 25-carboxylic acid methyl ester or 3β-hydroxy-22-keto-23-diethylaminosulfonylchol-5-ene 25-carboxylic acid methyl ester to the foregoing procedure.

Similar results are obtained by employing zinc amalgam in aqueous tetrahydrofuran or chromous chloride (obtained from chromium chloride and zinc amalgam) in aqueous acetone.

EXAMPLE 28

Five hundred milligrams of 2β,3β-isopropylidenedioxy-6,14α,22-trihydroxy-5β-chol-7-ene 25-carboxylic acid 22-lactone in 10 ml. of dry tetrahydrofuran is treated at 20° C. with 10 ml. of 2-molar methyl lithium in ether. The mixture is heated at 60° C. for two hours and then cooled and poured into water. This mixture is extracted with methylene chloride, and these extracts are washed with water, dried and evaporated to give 2β,3β-isopropylidenedioxy-6,14α,22,25-tetrahydroxycholest-7-ene, which may be recrystallized from ethyl acetate and employed as previously described.

What is claimed is:
1. The process for the preparation of steroids characterized by the structure:

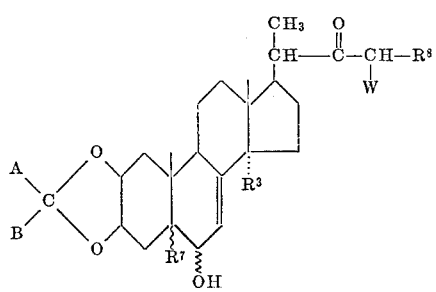

wherein,
each of A and B is hydrogen or lower alkyl;
$R^3$ is hydrogen or hydroxy;
$R^7$ is α-hydrogen, β-hydrogen or α-hydroxy;
$R^8$ is hydrogen, (lower)alkyl, hydroxy(lower)alkyl, tetrahydropyranyloxy(lower)alkyl, (lower)alkenyloxy(lower)alkyl, (lower)alkoxy(lower)alkyl, or benzyloxy(lower)alkyl; and
W is —S—$R^9$, —SO—$R^9$, —$SO_2$—$R^9$ or

—SO—N($R^9$)$_2$ in which $R^9$ in phenyl or (lower)alkyl;

which comprises treating a steroidal ester characterized by the structure:

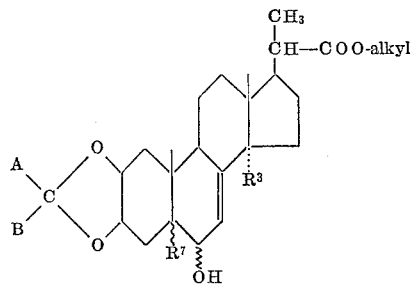

wherein A, B, $R^3$ and $R^7$ are as previously defined, with an alkali metal salt of a compound of the formula $R^8$—$CH_2$—W wherein $R^8$ and W are as previously defined, under nonaqueous basic conditions.

2. The process according to claim 1 wherein the alkali metal salt is a lithium salt and W is —SO—$R^9$ wherein $R^9$ is as therein defined.

3. The process according to claim 2 wherein $R^8$ is 2-methyl-2-(tetrahydropyran-2-yl)propyl and $R^9$ is phenyl.

4. The process acccording to claim 2 wherein $R^8$ is 2-methyl-2-(tetrahydropyran-2-yl)propyl, $R^9$ is phenyl, each of A and B is methyl, $R^3$ is hydroxy and $R^7$ is β-hydroxy.

5. The process according to claim 2 wherein $R^8$ is hydrogen and $R^9$ is methyl.

6. The process according to claim 2 wherein $R^8$ is hydrogen, $R^9$ is methyl, each of A and B is hydrogen, $R^3$ is hydroxy and $R^7$ is β-hydrogen.

7. The process which comprises treating a sulfur-containing steroidal compound characterized by the structure:

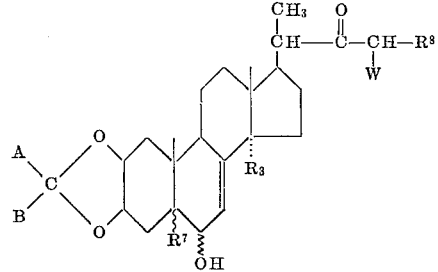

wherein,
each of A and B is hydrogen or lower alkyl;
$R^3$ is hydrogen or hydroxy;
$R^7$ is α-hydrogen, β-hydrogen or α-hydroxy;
$R^8$ is hydrogen, (lower)alkyl, hydroxy(lower)alkyl, tetrahydropyranyloxy(lower)alkyl, [(lower)alkenyl-(lower)alkyl], (lower)alkenyloxy(lower)alkyl, (lower)alkoxy(lower)alkyl, or benzyloxy(lower)alkyl; and W is —S—$R^9$, —SO—$R^9$, —$SO_2$—$R^9$ or

—SO—N($R^9$)$_2$ in which $R^9$ is phenyl or (lower)alkyl.
with aluminum amalgam, zinc amalgam, Raney nickel, zinc and acetic acid, or chromous chloride, so as to form a steroidal compound characterized by the structure:

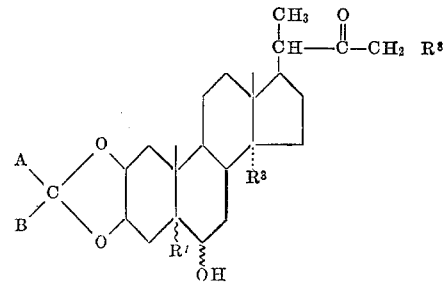

wherein A, B, $R^3$, $R^7$ and $R^8$ are as previously defined.

8. The process according to claim 7 wherein said sulfur-containing steroidal compound is 2β,3β-isopropylidenedioxy-6,14α-dihydroxy-23-phenylsulfinyl - 25 - (tetrahydropyran-2-yl)-5β-cholest-7-en-22-one and said treatment is with aluminum amalgam.

9. The process which comprises treating a sulfur-containing steroidal compound characterized by the structure:

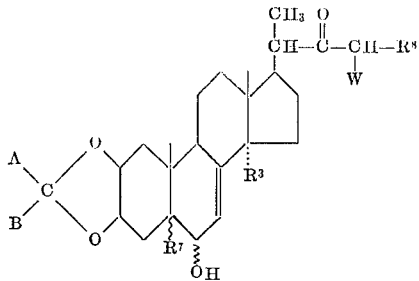

wherein,
each of A and B is hydrogen or lower alkyl;
$R^3$ is hydrogen or hydroxy;
$R^7$ is α-hydrogen, β-hydrogen or α-hydroxy;
$R^8$ is hydrogen or (lower)alkyl; and
W is —S—$R^9$, —SO—$R^9$, —SO$_2$—$R^9$ or

—SO—N($R^9$)$_2$ in which $R^9$ is phenyl or (lower)alkyl;
with an α-halo compound of the formula:

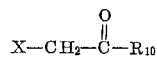

wherein
X is chloro or bromo; and
$R^{10}$ is (lower)alkyl or (lower)alkoxy;
under anhydrous conditions in an organic solvent in the presence of a base, thereby forming a steroidal compound characterized by the structure:

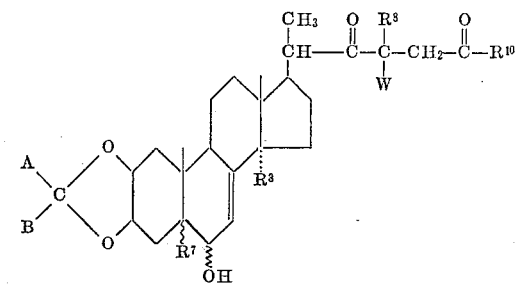

wherein A, B, $R^3$, $R^7$, $R^8$, $R^{10}$ and W are as herein defined.

10. The process according to claim 9 wherein W is methylsulfinyl and the α-halo compound is a lower alkyl ester of α-bromoacetic acid.

11. The process according to claim 9 wherein the sulfur-containing steroidal compound is 2β,3β-alkylidenedioxy-6,14α-dihydroxy-23-methylsulfinyl - 24-norchol-7-en-22-one and the α-halo compound is methyl α-bromoacetate.

12. The process according to claim 9 wherein the sulfur-containing steroidal compound is 2β,3β-isopropylidenedioxy-6,14α-dihydroxy - 23 - methylsulfinyl-24-norchol-7-en-22-one, the α-halo compound is bromoacetone, and the basic conditions provide at least four equivalents of base so as to permit the 2β,3β-alkylidenedioxy-6,14α-dihydroxy-22,25-diketo - 23 - methylsulfinyl - 27 - nor-5β-cholest-7-ene thereby formed to undergo internal cyclization, thereby forming 2β,3β-alkylidenedioxy-6,14α,25-trihydroxy-22-keto-23,26-sulfinyl-5β-chol-7-ene.

13. The process for the preparatiton of compounds of the formula:

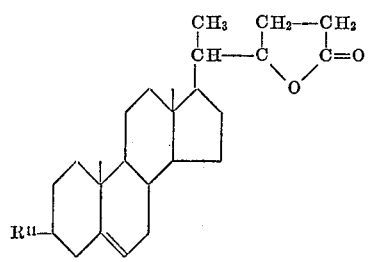

wherein $R^{11}$ is hydroxy or tetrahydropyran-2-yloxy, which comprises treating a 3-hydroxy-22,23-bisnorchol-5-enoic acid (lower)alkyl ester or a 3-(tetrahydropyran-2-yl)ether thereof with a lithium salt of dimethylsulfoxide; treating the resultant 22-keto-23-methylsulfinyl-24-norchol-5-ene derivative with a (lower)alkyl ester of an α-bromoacetic acid under basic conditions; treating the resultant 22-keto-23-methylsulfinylchol-5-ene 25-carboxylic acid (lower)alkyl ester derivative with aluminum amalgam; and reducing the resulting 22-ketochol-5-ene 25-carboxylic acid (lower)alkyl ester derivative with an alkali metal hydride reducing agent.

14. The process according to claim 13 wherein the alkali metal hydride reducing agent is lithium tri(t-butoxide)aluminum hydride.

15. Compounds of the formula:

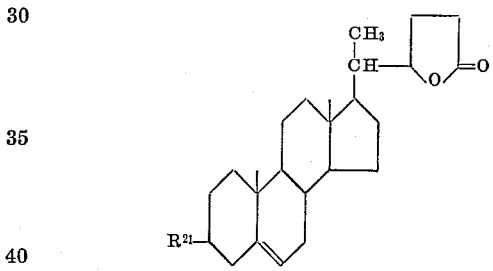

wherein $R^{11}$ is hydroxy or tetrahydropyran-2-yloxy.

16. Compounds of the formula:

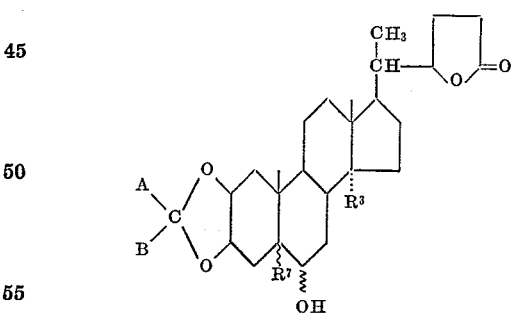

wherein
each of A and B is hydrogen or (lower)alkyl;
$R^3$ is hydrogen or hydroxy; and
$R^7$ is α-hydrogen, β-hydrogen or α-hydroxy.

17. The compound according to claim 16 wherein each of A and B is (lower)alkyl; $R^3$ is hydroxy; and $R^7$ is β-hydrogen.

18. Compounds of the formula:

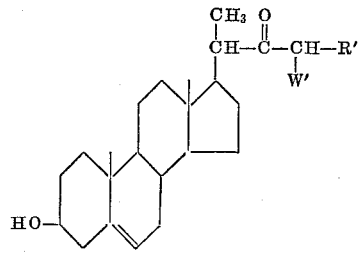

wherein W' is —SO—CH$_3$, —SO$_2$—CH$_3$,
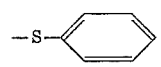
or —SO—N(—CH$_2$—CH$_3$)$_2$ and R' is hydrogen or
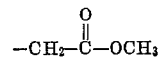
References Cited
UNITED STATES PATENTS
2,386,749  10/1945  Ruzicka _____ 260—239.57
ELBERT L. ROBERTS, Primary Examiner
U.S. Cl. X.R.
260—239.55, 397.1, 397.2